United States Patent
Yamashita

(10) Patent No.: US 12,347,878 B2
(45) Date of Patent: Jul. 1, 2025

(54) CYLINDRICAL BATTERY

(71) Applicant: SANYO Electric Co., Ltd., Kadoma (JP)

(72) Inventor: Keisuke Yamashita, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 465 days.

(21) Appl. No.: 17/785,267

(22) PCT Filed: Dec. 9, 2020

(86) PCT No.: PCT/JP2020/045746
§ 371 (c)(1),
(2) Date: Jun. 14, 2022

(87) PCT Pub. No.: WO2021/124995
PCT Pub. Date: Jun. 24, 2021

(65) Prior Publication Data
US 2022/0376332 A1   Nov. 24, 2022

(30) Foreign Application Priority Data
Dec. 18, 2019   (JP) .................................. 2019-227988

(51) Int. Cl.
*H01M 50/184*   (2021.01)
*H01M 50/107*   (2021.01)
(Continued)

(52) U.S. Cl.
CPC ....... *H01M 50/184* (2021.01); *H01M 50/107* (2021.01); *H01M 50/188* (2021.01);
(Continued)

(58) Field of Classification Search
CPC .. H01M 50/107; H01M 50/342; H01M 50/54; H01M 50/578;
(Continued)

(56) References Cited

U.S. PATENT DOCUMENTS

2009/0181287 A1* 7/2009 Janmey ............... H01M 50/193
429/56
2015/0072179 A1 3/2015 Itabashi
(Continued)

FOREIGN PATENT DOCUMENTS

CN    106030850 A   10/2016
EP      3913701 A1   11/2021
(Continued)

OTHER PUBLICATIONS

WO 2021124995 A1 machine translation (Year: 2021).*
(Continued)

*Primary Examiner* — Kourtney R S Carlson
*Assistant Examiner* — Travis L. Martin
(74) *Attorney, Agent, or Firm* — WHDA, LLP

(57) ABSTRACT

A cylindrical battery includes: an outer can in the shape of a bottomed cylinder; a sealing body which closes one end of the outer can; an electrode body disposed inside the outer can; and an insulating resin component disposed between the outer can and the sealing body. The sealing body includes a metal component which is connected to a positive electrode lead that leads out from the electrode body. The metal component has an easily broken portion radially inward of the connecting portion of the metal component and the positive electrode lead, and is crimp-secured by means of the outer can, with the resin component interposed therebetween. The resin component is crimp-secured by means of the metal component, on the radially inner side of the metal component relative to the easily broken portion.

5 Claims, 2 Drawing Sheets

(51) Int. Cl.
*H01M 50/188* (2021.01)
*H01M 50/342* (2021.01)
*H01M 50/552* (2021.01)
*H01M 50/559* (2021.01)
*H01M 50/578* (2021.01)

(52) U.S. Cl.
CPC ....... *H01M 50/342* (2021.01); *H01M 50/552* (2021.01); *H01M 50/559* (2021.01); *H01M 50/578* (2021.01)

(58) Field of Classification Search
CPC ......... H01M 50/543–567; H01M 50/183–198; H01M 50/552; Y02E 60/10
See application file for complete search history.

(56) References Cited

U.S. PATENT DOCUMENTS

| | | |
|---|---|---|
| 2017/0110699 A1 | 4/2017 | Kohira et al. |
| 2018/0026238 A1 | 1/2018 | Andou et al. |
| 2018/0047949 A1 | 2/2018 | Sugimoto et al. |
| 2018/0062124 A1 | 3/2018 | Kohira et al. |
| 2018/0351140 A1 | 12/2018 | Muroya et al. |
| 2021/0083236 A1 | 3/2021 | Kim et al. |
| 2021/0119291 A1 | 4/2021 | Kohira et al. |

FOREIGN PATENT DOCUMENTS

| | | |
|---|---|---|
| EP | 4068443 A1 | 10/2022 |
| JP | 10-188934 A | 7/1998 |
| JP | 2018-206507 A | 12/2018 |
| WO | 2013/111318 A1 | 8/2013 |
| WO | 2016/143287 A1 | 9/2016 |
| WO | 2016/157748 A1 | 10/2016 |
| WO | 2016/157750 A1 | 10/2016 |
| WO | 2019/026527 A1 | 2/2019 |
| WO | 2019/235721 A1 | 12/2019 |

OTHER PUBLICATIONS

Office Action dated Sep. 28, 2022, issued in counterpart to IN Application No. 202247034748, with English Translation. (4 pages).
International Search Report dated Mar. 2, 2021, issued in counterpart International Application No. PCT/JP2020/045746, w/English Translation. (5 pages).
Extended (Supplementary) European Search Report dated Jul. 3, 2023, issued in counterpart EP application No. 20901542.9. (7 pages).
Office Action dated Mar. 6, 2024, issued in counterpart CN Application No. 202080087126.0, with English translation. (10 pages).
Office Action dated Dec. 17, 2024, issued in counterpart JP application No. 2021-565504. (3 pages).

* cited by examiner

CYLINDRICAL BATTERY

CROSS-REFERENCE TO RELATED APPLICATIONS

This application is a national stage of International Application No. PCT/JP2020/045746, filed Dec. 9, 2020, which claims priority to Japanese Patent Application No. 2019-227988 filed Dec. 18, 2019 both of which are hereby incorporated by reference in their entirety.

TECHNICAL FIELD

The present disclosure relates to a cylindrical battery.

BACKGROUND ART

In recent years, there has been a need for a secondary battery to have a further increased capacity because applications have been expanding to a power source for electric vehicles, a power storage device for utilizing natural energy, and the like. In electric vehicle and power storage devices, a battery module is used, which is formed by connecting a number of secondary batteries in series or in parallel via an external lead. As the capacity of the secondary battery increases, higher safety is required for the secondary battery and the battery module. Traditionally, when a battery internal pressure is abnormally increased due to overcharge of the secondary battery, for example, a current path in the secondary battery is caused to be interrupted to prevent thermal runaway and rupture of the secondary battery in advance.

Patent Literature 1 describes a cylindrical battery in which a current interruption mechanism is incorporated into a sealing member that seals one end of an exterior can to ensure safety. The current interruption mechanism is configured by combining a valve member made of a metal, an insulating member, and a metal body having a ventilation hole. Respective central portions of the valve member and the metal body are connected to each other, and the insulating member is interposed between their respective outer peripheral portions. When a battery internal pressure increases, the metal body pulls a connection part with the valve member outward of the battery, and the connection part or a thin portion provided in the metal body is fractured so that a current path between the valve member and the metal body is interrupted. Further, when the battery internal pressure increases, the valve member is fractured with the thin portion of the valve member used as a starting point, whereby a gas in the battery is exhausted.

CITATION LIST

Patent Literature

PATENT LITERATURE 1: International Publication No. WO 2016/157748

SUMMARY

Technical Problem

In a configuration described in Patent Literature 1, the sealing member that closes the one end of the exterior can includes three components, i.e., the valve member, the insulating member, and the metal body to make the sealing member have a current interruption function. Since the components are required to reliably operate at the time of an abnormality in the battery, it is essential that each have a complicated and highly accurate processed shape. As the number of components constituting the sealing member increases, like in the configuration described in Patent Literature 1, this places a large burden such as an increase in the number of man-hours in processing. Thus, it is desired to reduce the number of components constituting the sealing member.

It is an advantage of the present disclosure to provide a cylindrical battery capable of reducing the number of components constituting a sealing member that closes one end of an exterior can by making a metal component constituting the sealing member have a current interruption function.

Solution to Problem

A cylindrical battery according to the present disclosure comprises an exterior can having a bottomed cylindrical shape, a sealing member that closes one end of the exterior can, an electrode assembly arranged in the exterior can, and a resin component having electrical insulation disposed between the exterior can and the sealing member, wherein the sealing member includes a metal component electrically connected to an electrode lead led out from the electrode assembly, the metal component includes an easy fracture part radially inside a connection part between the metal component and the electrode lead, and is crimped caulked and fixed by the exterior can with the resin component interposed therebetween, and the resin component is crimped and fixed by the metal component more radially inside the metal component than the easy fracture part.

Advantageous Effect of Invention

The cylindrical battery according to present disclosure makes it possible to reduce the number of components constituting the sealing member because it is capable of making the metal component constituting the sealing member have a current interruption function.

DESCRIPTION OF EMBODIMENTS

An embodiment of the present invention will be described in detail below with reference to the accompanying drawings. In the following description, specific shapes, materials, and directions, for example, are examples to facilitate understanding of the present disclosure, and can be appropriately changed to match uses, purposes, and specifications, for example, of a cylindrical battery. Although a case where the cylindrical battery is a non-aqueous electrolyte secondary battery will be described below, the cylindrical battery is not limited to this.

Figure 1:
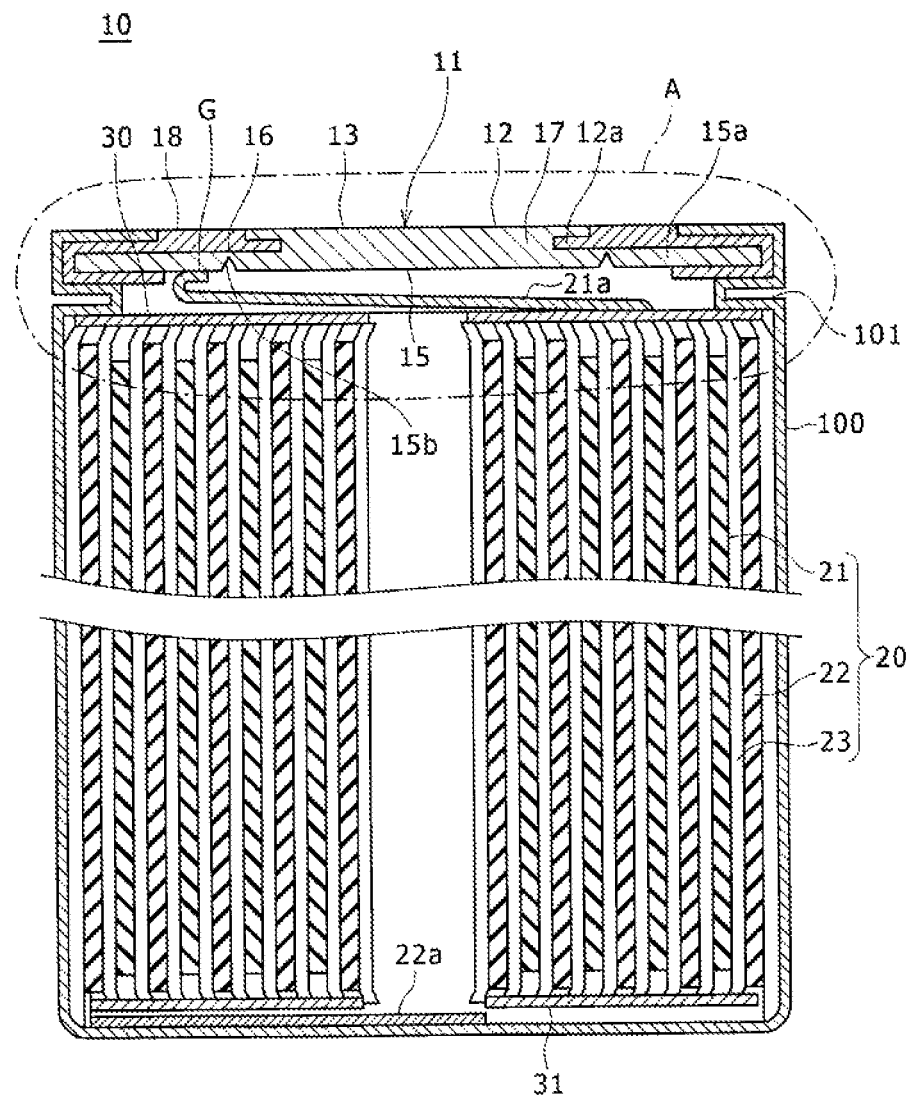
FIG. 1 is a sectional view of a cylindrical battery according to an example of an embodiment.

FIG. 1 is a sectional view of a cylindrical battery 10 according to the embodiment. For example, a non-aqueous electrolyte secondary battery such as a lithium ion battery is used for the cylindrical battery 10. The cylindrical battery 10 is configured by housing an electrode assembly 20 and a non-aqueous electrolyte (not illustrated) in a substantially cylindrical exterior can 100 having a bottomed cylindrical shape. A sealing member 11 is fixed to an opening at one end (an upper end in FIG. 1) of the exterior can 100 with a resin component 18 having electrical insulation interposed therebetween. As a result, the opening at the one end of the exterior can 100 is closed by the sealing member 11 with the resin component 18 interposed therebetween. The resin component 18 is an insulating member, and has a function as a gasket that seals a space between the exterior can 100 and the sealing member 11, and also has a function of exhausting a gas when a battery internal pressure increases, as described below. The non-aqueous electrolyte contains a non-aqueous solvent and an electrolyte salt dissolved in the non-aqueous solvent. The non-aqueous electrolyte is not limited to a liquid electrolyte, and may be a solid electrolyte using a gel polymer or the like.

The electrode assembly 20 is of a wound type, includes a positive electrode plate 21, a negative electrode plate 22, and a separator 23, and is obtained by winding the positive electrode plate 21 and the negative electrode plate 22 in a spiral shape with the separator 23 interposed therebetween. Hereinafter, one side in a winding axis direction of the electrode assembly 20 and the other side in the winding axis direction may be respectively referred to as "upper" and "lower".

The sealing member 11 is composed of only a metal component 12. The metal component 12 has a function as a positive electrode terminal and a function as a current interruption function for interrupting a current path when the battery internal pressure increases. The metal component 12 includes a disk-shaped outer end plate portion 13 disposed at an outer end of the battery, a disk-shaped inner end plate portion 15 disposed at an inner end of the battery, and a disk-shaped connection part 17 that connects the outer end plate portion 13 and the inner end plate portion 15 to each other. The outer diameter of the outer end plate portion 13 is smaller than the outer diameter of the inner end plate portion 15. The outer diameter of the connection part 17 is smaller than the respective outer diameters of the outer end plate portion 13 and the inner end plate portion 15. The outer end plate portion 13, the inner end plate portion 15, and the connection part 17 are coaxial such that their respective center axes match one another. As a result, a circular groove portion 12a is formed between the outer end plate portion 13 and the inner end plate portion 15 of the metal component 12, and a flange portion 15a is formed radially outside the connection part 17 as part of the inner end plate portion 15. The metal component 12 can be produced by aluminum or an aluminum alloy, for example. An external lead (not illustrated) to be electrically connected to another cylindrical battery in a battery module (not illustrated) is bonded by welding to an outer surface (an upper surface in FIG. 1) of an external terminal composed of the outer end plate portion 13.

An end portion of a positive electrode lead 21a led out from the electrode assembly 20 is connected to an inner side surface of a portion in a radial direction of the flange portion 15a. The positive electrode lead 21a corresponds to an electrode lead. Further, the flange portion 15a includes an easy fracture part 16 radially inside a connection part G between the metal component 12 and the positive electrode lead 21a. The easy fracture part 16 is an annular thin portion formed in a portion in the radial direction of the flange portion 15a, and the easy fracture part 16 is formed once a circularly annular groove 15b is formed in a portion in the radial direction of an inner side surface (a lower side surface in FIG. 1) of the flange portion 15a. The easy fracture part 16 can also be formed on an outer side surface (an upper side surface in FIG. 1) of the flange portion 15a.

The resin component 18 is disposed between an inner peripheral surface of the opening formed at the one end (the upper end in FIG. 1) of the exterior can 100 and an outer peripheral surface of the sealing member 11. A portion in a circumferential direction of the resin component 18 has a substantially J shape in cross section, whose battery outer side end portion (an upper end portion in FIG. 1) is longer than its battery inner side end portion (a lower end portion in FIG. 1), and its entirety is formed into an annular shape in a planar view. The flange portion 15a of the inner end plate portion 15 is crimped and fixed by the exterior can 100 with the resin component 18 interposed therebetween. The resin component 18 is held in a compressed state between the one end of the exterior can 100 and the outer peripheral surface of the sealing member 11, and is crimped and fixed by the metal component 12 more radially inside the metal component 12 than the easy fracture part 16. For example, as illustrated in FIG. 1, a distal end portion of the resin component 18 extending from between the flange portion 15a and the one end of the exterior can 100 is crimped and fixed by the outer end plate portion 13 and the inner end plate portion 15. With the distal end portion of the resin component 18 being crimped and fixed by the metal component 12 over its entire circumference, a sealing structure is formed between the distal end portion of the resin component 18 and the sealing member 11. As a result, even if the easy fracture part 16 is fractured due to the increase in the battery internal pressure, a sealing property in the battery is ensured. A material that ensures electrical insulation and does not affect a battery characteristic can be used for the resin component 18. Polymer resin is preferable as a material for the resin component 18, and examples thereof include polypropylene (PP) resin and polybutylene terephthalate (PBT) resin.

Figure 2:
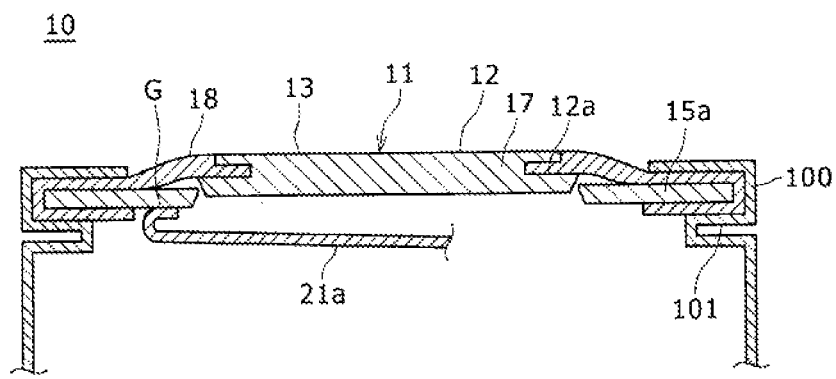
FIG. 2 is a diagram corresponding to a portion A in FIG. 1 and illustrating a state where a current interruption mechanism has operated due to an increase in battery internal pressure from a state illustrated in FIG. 1.
Figure 3:
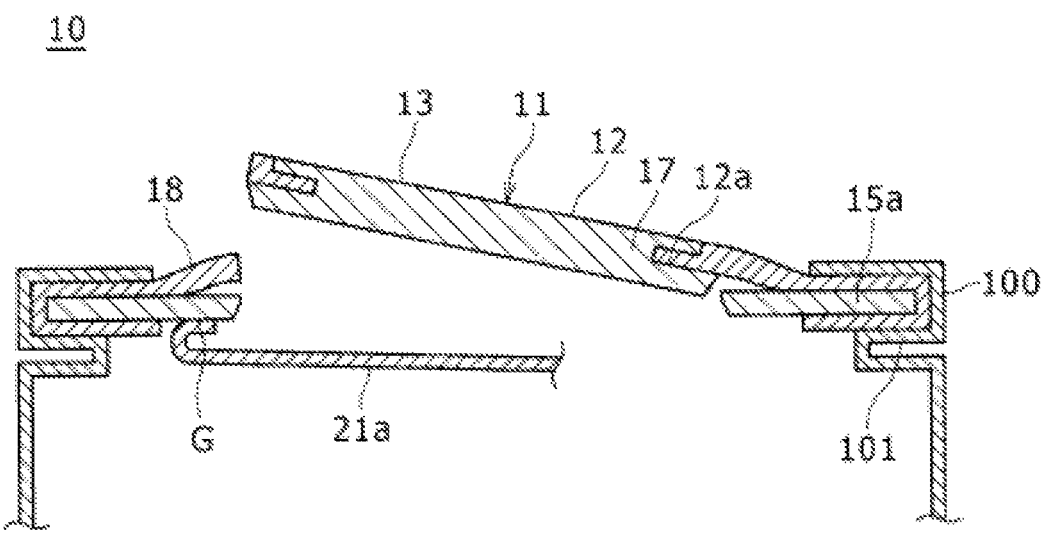
FIG. 3 is a diagram corresponding to the portion A in FIG. 1 and illustrating a state where a gas exhaust mechanism has operated due to a further increase in battery internal pressure from the state illustrated in FIG. 2.

As described above, in the cylindrical battery 10, the sealing property in the battery is also ensured after the easy fracture part 16 is fractured due to the increase in the battery internal pressure. When the battery internal pressure further increases, the resin component 18 is deformed to the outside of the battery so that a portion including the outer end plate portion 13 is separated along the easy fracture part 16 from the metal component 12, as illustrated in FIG. 2. A current interruption mechanism is thus configured such that a current path between a central portion of the metal component 12 to which the external lead is connected and the positive electrode lead 21a is interrupted. When the battery internal pressure further increases, a portion of the resin component 18 is fractured, as illustrated in FIG. 3. A gas exhaust mechanism is thus configured such that a gas in the battery is exhausted. While the strength of the resin component 18 can be adjusted by its material quality and thickness, the resin component 18 may alternatively be provided with an easy fracture part like an annular groove.

The above-described current interruption mechanism and gas exhaust mechanism will be described in more detail. When a battery internal pressure at which the easy fracture part 16 is fractured is defined as P1, a battery internal pressure at which the resin component 18 is fractured as P2, and a battery internal pressure at which the resin component 18 comes off the metal component 12 as P3, the respective fracture strengths of the easy fracture part 16 and the resin component 18 and the fixing strength to the resin component 18 by the metal component 12 are limited such that a relationship of P1<P2<P3 holds. When the battery internal pressure reaches P1, a portion to which the external lead is connected can be separated along the easy fracture part 16 from the metal component 12 because the resin component 18 is likely to be deformed to the outside of the battery even when only a portion of the easy fracture part 16 is fractured. When the battery internal pressure increases and reaches P2 after the easy fracture part 16 is fractured, the resin component 18 is fractured so that a gas in the battery is exhausted. The respective fracture strengths of the easy fracture part 16 and the resin component 18 and the fixing strength to the resin component 18 by the metal component 12 may be limited such that a relationship of P1<P3<P2 holds. In this case, the portion to which the external lead is connected can also be separated along the easy fracture part 16 from the metal component 12, like in the foregoing. When the battery internal pressure increases and reaches P3 after the easy fracture part 16 is fractured, the distal end portion of the resin component 18 comes off the metal component 12 so that a gas in the battery is exhausted. In the foregoing relational expression, P2 and P3 may satisfy a relationship of P2=P3.

The easy fracture part 16 is preferably formed in an annular shape. An annular easy fracture part may be formed by a stepped portion the thickness of which is changed in a radial direction of the inner end plate portion 15. The easy fracture part 16 may be partially discontinuous, like in a C shape, in a range in which the current interruption mechanism can be implemented. The fracture strength of the resin component 18 can be adjusted depending on its material quality and thickness, and an easy fracture part may also be formed in the resin component 18. An easy fracture part in the resin component 18 can be formed as an annular or C-shaped groove, for example. The easy fracture part may be formed by a stepped portion the thickness of which is changed in a radial direction of the resin component 18. The fixing strength to the resin component 18 by the metal component 12 can be adjusted by a press working pressure applied when compressing the resin component 18.

Then, the electrode assembly 20 will be described. The electrode assembly 20 is arranged in the exterior can 100. The positive electrode plate 21 constituting the electrode assembly 20 includes a positive electrode current collector and a positive electrode active material layer formed on the positive electrode current collector. For example, the positive electrode active material layer is formed on both surfaces of the positive electrode current collector. A metal foil made of aluminum or the like, or a film having a surface layer of the metal, for example, is used for the positive electrode current collector. A preferable positive electrode current collector is a metal foil mainly composed of aluminum or an aluminum alloy. The thickness of the positive electrode current collector is 10 μm to 30 μm for example.

The positive electrode active material layer preferably contains a positive electrode active material, a conductive agent, and a binder. The positive electrode plate 21 is produced by applying a positive electrode mixture slurry containing a positive electrode active material, a conductive agent, a binder, and a dispersion medium such as N-methyl-2-pyrrolidon (NMP) onto both surfaces of the positive electrode current collector, followed by drying and rolling.

Examples of the positive electrode active material can include a lithium-containing transition metal composite oxide containing a transition metal element such as Co, Mn, or Ni. The lithium-containing transition metal composite oxide is not particularly limited, but may be preferably a composite oxide represented by a general formula: $Li_{1+x}MO_2$ (in the formula, $-0.2 < x \leq 0.2$, where M contains at least one of Ni, Co, Mn, and Al).

Examples of the above-described conductive agent include carbon materials such as carbon black (CB), acetylene black (AB), ketjen black, and graphite. Examples of the above-described binder include fluorine-based resin such as polytetrafluoroethylene (PTFE) or polyvinylidene fluoride (PVdF), polyacrylonitrile (PAN), polyimide (PI), acrylic-based resin, and polyolefin-based resin. The resins and carboxymethyl cellulose (CMC) or its salt, polyethylene oxide (PEO), or the like may be used in combination. These may be each used alone or in a combination of two or more thereof.

The positive electrode plate 21 is provided with a positive electrode current collector exposed part (not illustrated) where a surface of a metal composing a positive electrode current collector is exposed. The positive electrode current collector exposed part is a portion to which the positive electrode lead 21a is connected and is a portion where a surface of the positive electrode current collector is not covered with a positive electrode active material layer. One end-side portion of the positive electrode lead 21a is bonded to the positive electrode current collector exposed part by ultrasonic welding, for example. The other end-side portion of the positive electrode lead 21a is led out upward through an opening (not illustrated) formed in a disk-shaped first insulating plate 30 disposed on the upper side of the electrode assembly 20 and is connected to a lower surface (inner surface) of the flange portion 15a of the metal component 12. Examples of a material for the positive electrode lead 21a include aluminum, an aluminum alloy, nickel, a nickel alloy, iron, and stainless steel.

The negative electrode plate 22 includes a negative electrode current collector and a negative electrode active material layer formed on the negative electrode current collector. For example, a negative electrode active material layer is formed on both surfaces of the negative electrode current collector. Further, the negative electrode plate 22 has a negative electrode current collector exposed part (not illustrated) provided in its winding-end end portion. The negative electrode current collector exposed part is a portion to which a negative electrode lead 22a is connected and is a portion where a surface of the negative electrode current collector is not covered with the negative electrode active material layer. One end-side portion of the negative electrode lead 22a is bonded to the negative electrode current collector exposed part by ultrasonic welding, for example. The other end-side portion of the negative electrode lead 22a is connected to a bottom portion of the exterior can 100 through the outer peripheral side of a disk-shaped second insulating plate 31 disposed on the lower side of the electrode assembly 20.

The negative electrode active material layer preferably contains a negative electrode active material and a binder. The negative electrode plate 22 is produced by applying a negative electrode mixture slurry containing a negative electrode active material, a binder, and water, for example, on both surfaces of the negative electrode current collector, followed by drying and rolling.

The negative electrode active material is not particularly limited as long as it can reversibly occlude and release lithium ions, and examples of the negative electrode active material to be used can include a carbon material such as natural graphite or artificial graphite, a metal to be alloyed with lithium, such as Si or Sn, an alloy containing these, and a composite oxide. As the binder contained in the negative electrode active material layer, resin similar to that in the positive electrode plate 21, for example, is used. If the negative electrode mixture slurry is prepared with an aqueous solvent, styrene-butadiene rubber (SBR), CMC or its salt, a polyacrylic acid or its salt, polyvinyl alcohol, and the like can be used. These may be each used alone or in a combination of two or more thereof.

The negative electrode plate 22 is used by being wound with it being laminated on the positive electrode plate 21 via the separator 23. With the use of the negative electrode lead 22a or the negative electrode lead 22a being omitted, the negative electrode plate 22 may be electrically connected to the exterior can 100 by arranging a negative electrode current collector exposed part over the entire circumference of an outermost peripheral surface of the winding-end-side end portion of the negative electrode plate 22 and bringing the negative electrode current collector exposed part into contact with an inner peripheral surface of a cylindrical portion of the exterior can 100. This makes it possible to ensure more preferable current collectability. At this time, the one end-side portion of the negative electrode lead 22a may be bonded to the negative electrode current collector exposed part formed in a winding-start-side end portion of the negative electrode plate 22.

A porous sheet having ion permeability and electrical insulation is used for the separator 23. Specific examples of the porous sheet can include a microporous thin film, a woven fabric, and a non-woven fabric. As a material for the separator 23, polyolefin-based resin such as polyethylene or polypropylene is preferable. The thickness of the separator 23 is 10 μm to 50 μm, for example. The separator 23 tends to be thinner as the battery increases in capacity and output power. The separator 23 has a melting point of approximately 130° C. to 180° C., for example.

The cylindrical battery 10 is assembled in the following manner, for example. For example, the electrode assembly 20, together with the disk-shaped second insulating plate 31 on the lower side thereof, is inserted into the inside of the exterior can 100 having a bottomed cylindrical shape produced by drawing a steel plate, and the negative electrode lead 22a connected to the negative electrode plate 22 is connected to the bottom portion of the exterior can 100 by welding. Then, the disk-shaped first insulating plate 30 is inserted into the upper side of the electrode assembly 20 inside the exterior can 100, and a groove portion 101 (FIG. 1) having a U shape in cross section is formed by plastic working over its entire circumference in its circumferential direction on the side of the opening above the first insulating plate 30 in the exterior can 100. Then, a predetermined amount of prepared non-aqueous electrolyte is injected into the exterior can 100 including the electrode assembly 20. The positive electrode lead 21a connected to the positive electrode plate 21 is then connected by welding to the flange portion 15a of the metal component 12 constituting the sealing member 11. At this time, the resin component 18 has been previously crimped and fixed to the outer peripheral side of the metal component 12. For example, the resin component 18 is crimped and fixed to the metal component 12 after performing press working such that the resin component 18 is compressed by the inner end plate portion 15 and the outer end plate portion 13 of the metal component 12. The metal component 12 is then housed with the resin component 18 interposed therebetween on the groove portion 101 inside the exterior can 100 while the positive electrode lead 21a is folded, and a portion of the opening end of the exterior can 100 is crimped, thereby producing the sealed cylindrical battery 10. At this time, the outer end plate portion 13 is exposed as an uppermost layer portion of the cylindrical battery 10 at an upper end of the sealing member 11.

Alternatively, after the resin component 18 and the metal component 12 are arranged, without being crimped and fixed, inside one end portion of the exterior can 100, an outer peripheral portion of the metal component 12 may be crimped and fixed in the one end portion of the exterior can 100 with the resin component 18 interposed therebetween. Then, press working may be performed such that the resin component 18 is compressed by the inner end plate portion 15 and the outer end plate portion 13.

The above-described cylindrical battery 10 makes it possible to make the metal component 12 constituting the sealing member 11 have a current interruption function, thereby making it possible to reduce the number of components constituting the sealing member 11. As a result, the number of processing man-hours of the component requiring a processing accuracy can be reduced, resulting in reduction in manufacturing cost.

Figure 4:
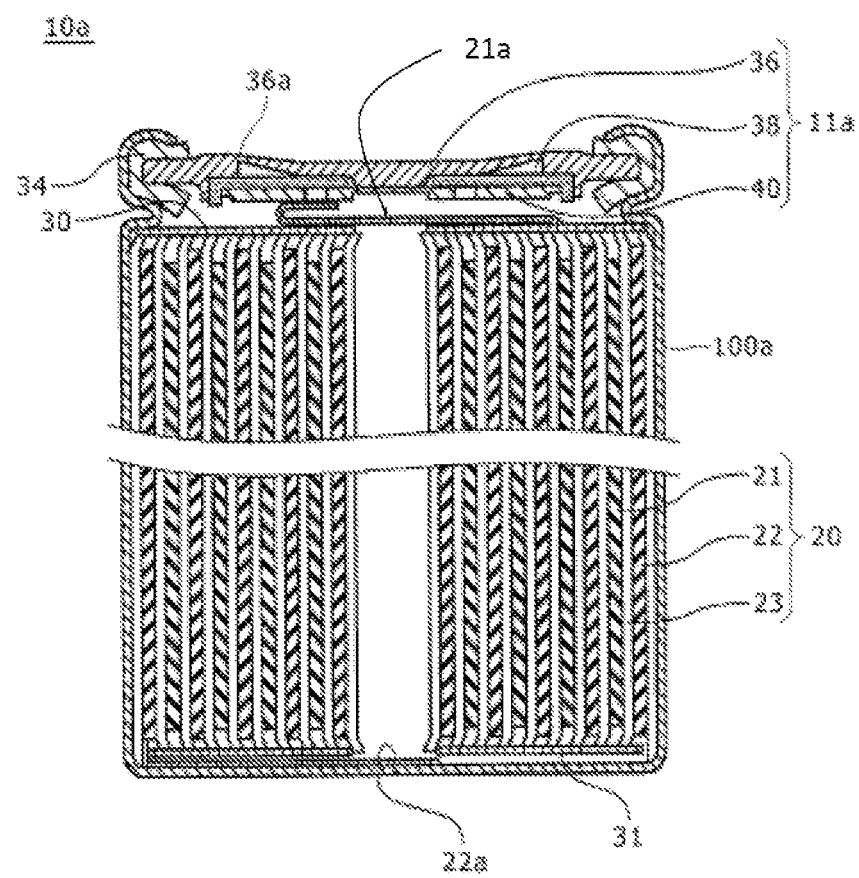
FIG. 4 is a sectional view of a cylindrical battery in a comparative example.

FIG. 4 is a sectional view of a cylindrical battery 10a in a comparative example. In the cylindrical battery 10a in the comparative example, a sealing structure at one end of an exterior can 100a includes a gasket 34 as a resin component and a sealing member 11a, unlike in the cylindrical battery 10 illustrated in FIG. 1 to FIG. 3. The sealing member 11a includes three components, i.e., a valve member 36 made of a metal, an insulating member 38, and a metal body 40 having a ventilation hole. Respective central portions of the valve member 36 and the metal body 40 are connected to each other, and the insulating member 38 is interposed between their respective outer peripheral portions. An end portion, which has been led out from an electrode assembly 20, of a positive electrode lead 21a is connected to the metal body 40 radially outside a connection part between the valve member 36 and the metal body 40. The metal body 40 is provided with a thin portion along the connection part with the valve member 36. When a battery internal pressure increases, the valve member 36 is deformed upward upon receipt of the internal pressure, to pull the connection part with the metal body 40 outward of the battery. The connection part or the thin portion provided in the metal body 40 is fractured so that a current path between the valve member 36 and the positive electrode lead 21a is interrupted. Further, when the battery internal pressure increases, the valve member 36 is fractured starting at a thin portion 36a in the valve member 36 so that a gas in the battery is exhausted. In the cylindrical battery 10a in the comparative example, the number of components for providing the sealing member 11a with a current interruption function is as large as three, which places a large burden, such as an increase in the number of man-hours in processing. Such inconvenience can be prevented according to the embodiment illustrated in FIG. 1 to FIG. 3.

REFERENCE SIGNS LIST 10, 10a cylindrical battery, 11, 11a sealing member, 12 metal component, 12a groove portion, 13 outer end plate portion, 15 inner end plate portion, 15a flange portion, 15*b* groove, 17 connection part, 18 resin component, 20 electrode assembly, 21 positive electrode plate, 21*a* positive electrode lead, 22 negative electrode plate, 22*a* negative electrode lead, 23 separator, 30 first insulating plate, 31 second insulating plate, 34 gasket, 36 valve member, 36*a* thin portion, 38 insulating member, 40 metal body.

The invention claimed is:

1. A cylindrical battery comprising:
   an exterior can having a bottomed cylindrical shape;
   a sealing member that closes one end of the exterior can;
   an electrode assembly arranged in the exterior can; and
   a resin component having electrical insulation disposed between the exterior can and the sealing member, wherein
   the sealing member includes a metal component electrically connected to an electrode lead led out from the electrode assembly,
   the metal component includes an easy fracture part radially inside a metal-lead connection part between the metal component and the electrode lead, and is crimped and fixed by the exterior can with the resin component interposed therebetween, and
   the resin component is crimped and fixed by the metal component more radially inside the metal component than the easy fracture part.

2. The cylindrical battery according to claim 1, wherein the metal component includes an inner end plate portion, an outer end plate portion, and a plate-plate connection part connecting the inner end plate portion and the outer end plate portion,
   a flange portion radially outside the inner end plate portion is crimped and fixed to one end of the exterior can with the resin component interposed therebetween, and
   a distal end portion of the resin component extending from between the flange portion and the one end of the exterior can is crimped and fixed to the inner end plate portion and the outer end plate portion.

3. The cylindrical battery according to claim 1, wherein the easy fracture part is formed as an annular groove.

4. The cylindrical battery according to claim 1, wherein when a battery internal pressure increases, the easy fracture part is fractured over its entirety in its circumferential direction so that a current path between a central portion of the metal component and the electrode lead is interrupted, and when the battery internal pressure further increases, an outer-side portion of the easy fracture part of the resin component is fractured so that a gas in the battery is exhausted.

5. The cylindrical battery according to claim 1, wherein when a battery internal pressure increases, the easy fracture part is fractured over its entirety in its circumferential direction so that a current path between a central portion of the metal component and the electrode lead is interrupted, and when the battery internal pressure further increases, a distal end portion of the resin component comes off the metal component so that a gas in the battery is exhausted.

* * * * *